United States Patent [19]

Stavric

[11] Patent Number: 4,725,474

[45] Date of Patent: Feb. 16, 1988

[54] BATT OF REFRACTORY MATERIAL

[75] Inventor: Zlatko Stavric, Bonn, Fed. Rep. of Germany

[73] Assignee: Norton Company, Worcester, Mass.

[21] Appl. No.: 633,376

[22] Filed: Jul. 23, 1984

[30] Foreign Application Priority Data

Jul. 27, 1983 [DE] Fed. Rep. of Germany ... 8321679[U]

[51] Int. Cl.[4] .................................... B32B 3/00

[52] U.S. Cl. .................................... 428/156; 452/258; 452/253; 452/260; 428/367

[58] Field of Search ................ 428/156, 367; 432/258, 432/253, 260

[56] References Cited

U.S. PATENT DOCUMENTS 2,512,567 6/1950 Milligan .............................. 432/258
2,515,416 7/1950 Milligan .............................. 432/258
3,615,149 10/1971 Malone et al. .................. 428/156 X
4,366,200 12/1982 Ecker .................................. 428/156

FOREIGN PATENT DOCUMENTS 1244808 9/1960 France ................................ 428/156
0201614 11/1983 Japan .................................. 428/156

*Primary Examiner*—Nancy Swisher
*Attorney, Agent, or Firm*—Arthur A. Loiselle, Jr.

[57] ABSTRACT

A refractory batt for supporting green ceramic or refractory ware during firing thereof, wherein said batt includes a groove or recess diagonally oriented in each quadrant, with the bottom of the recess or depression merging smoothly at the ends into the upper surface of the batt and spaced from the center and corner. The depth of the recess in each quadrant is not more than two thirds the thickness of the batt.

8 Claims, 3 Drawing Figures

BATT OF REFRACTORY MATERIAL

FIELD OF THE INVENTION

The instant invention relates to rectangular batts of refractory materials for use in kilns to receive green articles of ceramics or refractory material to be baked and is concerned specifically with the design of such a batt of refractory material aimed at improving thermal stability.

BACKGROUND OF THE INVENTION

The quick heating and cooling of the batts in kilns in the ceramic industry gives rise to considerable internal stresses. It is known to reduce the stresses upon heating by providing slot-like recesses in those batts. These slots start at the side edges and are directed inwardly and may be as long as one fourth of the width of the batt. Often such marginial slots extend from about 150 to 200 mm in parallel with the narrow sides of the batt. Experience has shown that this measure does relieve the stresses which occur upon heating, but is no sufficienty remedy in the cooling process.

SUMMARY OF THE INVENTION

It is, therefore, an object of the instant invention to devise an embodiment of the batt mentioned initially which will attain of improved resistance to temperature cycles. It is also an object of the invention to provide a batt of the kind in question characterized by longer service life. Another object of the invention resides in providing a batt which affords greater productivity by permitting quicker heat up and cooling.

To meet these and other objects it is provided, in accordance with the invention that the batt specified initially is formed in each quadrant of its upper surface with a groove-like recess or depression (blind groove) oriented approximately diagonally. The bottom of this recess or depression merges smoothly at its ends into the upper surface of the batt, and the ends of the recess or depression are spaced from the corner and center, respectively, of the batt, while the bottom is spaced from the underside of the batt by a distance which corresponds at least to one third of the thickness of the batt.

Such groove-like recesses may be provided directly as recesses or depressions in the forming process of the batt from unbaked refractory material. They may also be formed subsequently by cutting or milling the green or fired batt.

Surprisingly, the blind grooves in accordance with the invention have proved to be much more effective in increasing the resistance against temperature cycles and diminishing the stresses which occur upon heating and, above all, during cooling than the known marginal slots which extend parallel to the narrow sides and are continuous from top to bottom of the batt.

At least a total of four blind grooves should be present. Yet the number may be increased for greater batts. In that case additional similar blind grooves are to be provided between the diagonally disposed blind grooves.

Conveniently, the bottom of each groove-like recess or depression is curved like a circular arc, in longitudinal section, and the center of the radius of curvature which lies approximately above the diagonal of the batt is spaced from the corner of the batt in the direction of the batt width, said spacing corresponding to approximately one sixth of the batt width. A radius of curvature of the bottom of the groove of from 300 to 500 mm proved to be convenient in batts of regular sizes.

The blind groove should not cut too deeply into the batt. Although a distance between the bottom of the blind groove and the underside of the batt corresponding to approximately one third of the batt thickness still provides good results, preferably this distance should correspond to half the thickness of the batt.

Any groove-like recess or depression need not be particularly wide. A convenient width is from about 3 to 5 mm.

BRIEF DESCRIPTION OF THE DRAWING

The invention will be described further, by way of example, with reference to the accompanying drawing, in which.

DESCRIPTION OF THE PREFERRED EMBODIMENT

Figure 3:
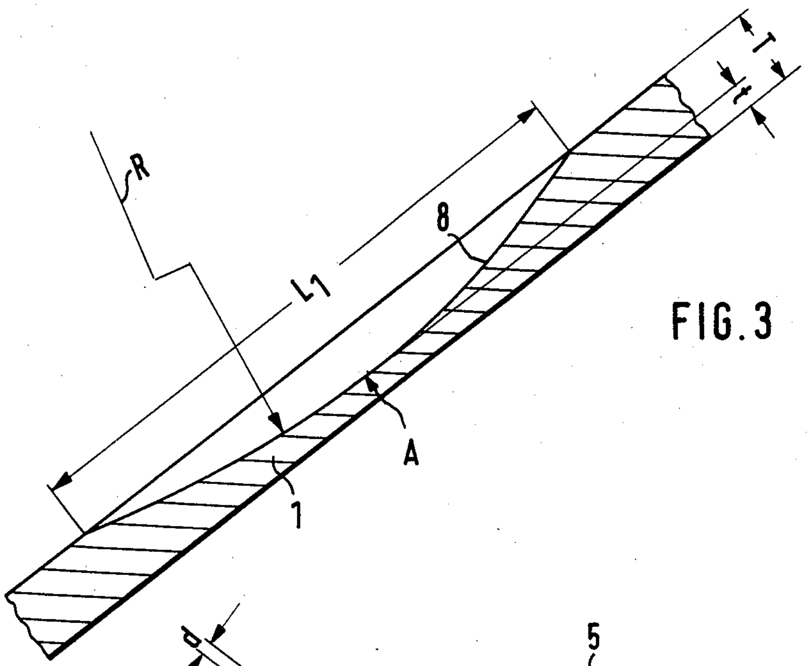
FIG. 3 is a part longitudinal sectional view of a groove-like recess.

A rectangular batt 1 made of refractory material, especially of SiC, cordierite or mullite may have a length L of 1000 mm and a width W of 700 mm. A groove-like recess 7 extending diagonally toward the middle 6 of the batt is formed in the upper surface 2 of the batt, in each quadrant 5. At both ends this recess merges continuously into the upper surface 2 of the batt 1, as may be seen above all in FIG. 3. In longitudinaly section the groove-like recess 7 formed as a blind bore has the contour of a circular arc, as may be seen in FIG. 3. Its radius of curvature is from 300 to 500 mm, and it has a length $L_1$ which corresponds to 40% of the diagonal of the quadrant 5.

Figure 1:
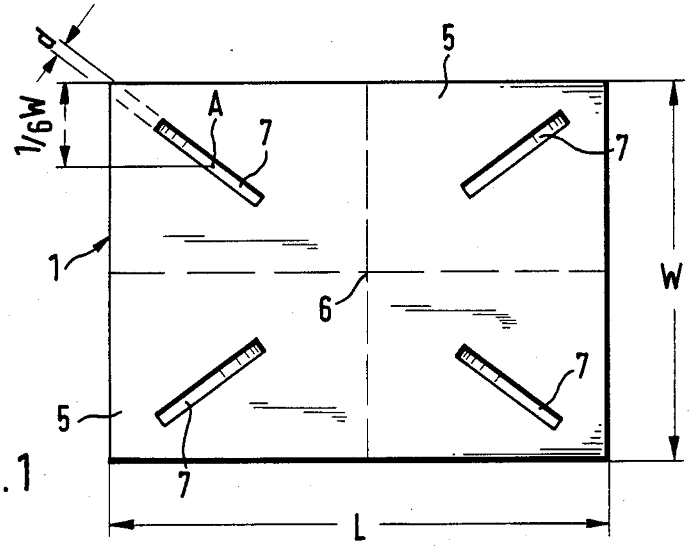
FIG. 1 is a top plan view of a batt.
Figure 2:
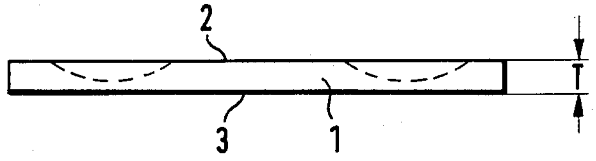
FIG. 2 is a side elevational view of the batt shown in FIG. 1.

At it slowest point A the bottom 8 of the blind groove or recess 7 is located at a spacing t from the underside 3 of the batt 1. This spacing t corresponds at least to one third of the batt thickness T, preferably it is about ½ T. The length $L_1$ of the blind groove 7 at the upper surface 2 of the batt is a function of the batt thickness T and of the radius of curvature R. As shown in FIG. 1, the center of the radius of curvature lies on a line perpendicular to the bottom of the groove at the lowest point A. The distance from the corner of the batt in the direction of the batt width is one sixth of the batt width W. The width d of each blind groove 7 is from 3 to 5 mm.

The batt is made of refractory material, particularly of traditional or recrystallized or nitrite-bound silicon carbide materials or of mullite or cordierite so as not to be affected even by very high temperatures of from 1600 to 1700° C.

What is claimed is:

1. A rectangular batt of refractory material, particularly silicon carbide (SiC) used for receiving (green) articles of ceramics or refractory materials to be baked and having recesses to reduce internal stresses occurring with great temperature changes, characterized in that a groove-like recess or depression (7) oriented approximately diagonally is formed in each quadrant (5) in the upper surface (2) of the batt (1), the bottom (8) of said recess or depression merging smoothly at the ends into the upper surface (2), the ends of said recess or depression being spaced from the corner and center, respectively, of the batt (1), and the bottom (8) having a spacing (t) from the underside (3) of the batt (1) corresponding at least to ⅓ of the thickness (T) of the batt.

2. The batt as claimed in claim 1, characterized in that in longitudinal section the bottom (8) of each groove-like recess or depression (7) is of circular arc contour, and that the center of the circular arc of the radius of curvature (R), which center is located approximately above the diagonal of the batt, is spaced from the corner of the batt in the direction of the batt width (W) by approximately 1/6 of the batt width (W).

3. The batt as claimed in claim 1 or 2, characterized in that the radius of curvature (R) of the bottom (8) of the groove-like recess or depression (7) is from 300 to 500 mm.

4. The batt as claimed in claim 1, characterized in that the bottom (8) of the groove-like recess or depression (7) is spaced from the underside (3) of the batt (1) by approximately half the batt thickness (T).

5. The batt as claimed in one of claim 1, characterized in that the width (d) of each groove-like recess or depression (7) is from 3 to 5 mm.

6. The batt as claimed in one of claim 1, characterized in that it is made of conventional recrystallized or nitrite-bound silicon carbide.

7. The batt as claimed in one of claim 1, characterized in that it is made of mullite.

8. The batt as claimed in one of claim 1, characterized in that it is made of cordierite.

* * * * *